(12) United States Patent
Rusenas et al.

(10) Patent No.: US 10,691,350 B2
(45) Date of Patent: Jun. 23, 2020

(54) METHOD FOR PROVISIONING A VOLUME OF DATA INCLUDING PLACING DATA BASED ON RULES ASSOCIATED WITH THE VOLUME

(71) Applicant: StorageOS Limited, Bicester (GB)

(72) Inventors: Karolis Rusenas, London (GB); Simon Croome, Kent (GB); Alex Chircop, Buckinghamshire (GB)

(73) Assignee: StorageOS Limited, Bicester (GB)

( * ) Notice: Subject to any disclaimer, the term of this patent is extended or adjusted under 35 U.S.C. 154(b) by 36 days.

(21) Appl. No.: 15/814,022

(22) Filed: Nov. 15, 2017

(65) Prior Publication Data
US 2018/0136862 A1 May 17, 2018

Related U.S. Application Data

(60) Provisional application No. 62/422,366, filed on Nov. 15, 2016.

(51) Int. Cl.
*G06F 3/06* (2006.01)
(52) U.S. Cl.
CPC ............ *G06F 3/0619* (2013.01); *G06F 3/065* (2013.01); *G06F 3/0605* (2013.01); *G06F 3/067* (2013.01); *G06F 3/0634* (2013.01); *G06F 3/0665* (2013.01)
(58) Field of Classification Search
CPC .... G06F 3/0619; G06F 3/0605; G06F 3/0634; G06F 3/065; G06F 3/0665; G06F 3/067
See application file for complete search history.

(56) References Cited

U.S. PATENT DOCUMENTS

| | | |
|---|---|---|
| 5,394,534 A | 2/1995 | Kulakowski et al. |
| 6,360,300 B1 | 3/2002 | Corcoran et al. |
| 7,587,570 B2 * | 9/2009 | Sarkar .................. G06F 3/0605 711/170 |

(Continued)

OTHER PUBLICATIONS

Microsoft Corporation; "Understanding Disk Terminology", Jun. 10, 2014; https://msdn.microsoft.com/en-us/library/dd163557(d=printer).aspx, Retrieved on Nov. 3, 2017; 2 pgs.

*Primary Examiner* — Glenn Gossage
(74) *Attorney, Agent, or Firm* — Loza & Loza, LLP

(57) ABSTRACT

A method for provisioning a volume of data is disclosed. The method involves identifying a set of rules associated with the volume of data, wherein the set of rules includes at least two conflicting rules, prioritizing the at least two conflicting rules, and placing the volume of data on a first computer system according to the prioritization. The method also includes collecting performance metrics corresponding to the placed volume of data, computing a score based on the collected performance metrics, determining if the computed score is acceptable, and determining that the placement is successful when the computer score is determined to be acceptable. The method further includes changing the prioritization of the at least two conflicting rules and placing the volume of data on a second computer system according to the changed prioritization when the score is determined to be unacceptable. The volume of data may be placed on the second computer system only during hours when the second computer system is not used, or during a period of time in which activity on the second computer system is relatively low.

8 Claims, 9 Drawing Sheets

(56) References Cited

U.S. PATENT DOCUMENTS

| | | | | |
|---|---|---|---|---|
| 8,151,048 B1* | 4/2012 | Premkumar | ............ | G06F 3/0605 |
| | | | | 710/305 |
| 8,473,678 B1* | 6/2013 | Rajasekaran | ......... | G06F 3/0605 |
| | | | | 711/114 |
| 8,495,221 B1* | 7/2013 | Tsunoda | .............. | H04L 67/1097 |
| | | | | 709/224 |
| 9,965,381 B1* | 5/2018 | Sahin | ................... | G06F 12/023 |
| 10,061,692 B1* | 8/2018 | Nicklin | .................. | G06F 3/067 |
| 2006/0236061 A1* | 10/2006 | Koclanes | .............. | G06F 3/0605 |
| | | | | 711/170 |
| 2010/0250880 A1 | 9/2010 | Mimatsu | | |
| 2013/0185531 A1* | 7/2013 | Emaru | ................... | G06F 3/061 |
| | | | | 711/162 |
| 2014/0250322 A1 | 9/2014 | Fleischmann et al. | | |
| 2014/0379923 A1* | 12/2014 | Oberg | ..................... | H04L 63/20 |
| | | | | 709/226 |
| 2015/0277768 A1* | 10/2015 | Zhou | ....................... | G06F 3/061 |
| | | | | 711/114 |
| 2016/0004449 A1 | 1/2016 | Lakshman et al. | | |
| 2016/0004450 A1 | 1/2016 | Lakshman et al. | | |
| 2016/0004451 A1 | 1/2016 | Lakshman et al. | | |
| 2016/0004466 A1 | 1/2016 | Lakshman | | |
| 2016/0004480 A1 | 1/2016 | Lakshman | | |
| 2016/0004481 A1 | 1/2016 | Lakshman | | |
| 2016/0004603 A1 | 1/2016 | Lakshman | | |
| 2016/0004611 A1 | 1/2016 | Lakshman et al. | | |
| 2016/0342438 A1* | 11/2016 | Cropper | ................ | G06F 9/5077 |
| 2017/0031614 A1 | 2/2017 | Katiyar et al. | | |
| 2017/0068472 A1 | 3/2017 | Periyagaram et al. | | |
| 2017/0177448 A1 | 6/2017 | Muth et al. | | |
| 2017/0295239 A1 | 10/2017 | Fang | | |
| 2017/0300254 A1 | 10/2017 | Mutha et al. | | |
| 2018/0048584 A1* | 2/2018 | Ra | ........................... | H04L 47/70 |

* cited by examiner

METHOD FOR PROVISIONING A VOLUME OF DATA INCLUDING PLACING DATA BASED ON RULES ASSOCIATED WITH THE VOLUME

CROSS-REFERENCE TO RELATED APPLICATIONS

This application is entitled to the benefit of provisional U.S. Patent Application Ser. No. 62/422,366, filed Nov. 15, 2016, entitled "METHOD AND SYSTEM FOR MANAGING THE OPERATION OF A COMPUTER SYSTEM SUCH AS A STORAGE SYSTEM," which is incorporated by reference herein.

FIELD OF THE INVENTION

The invention relates generally to storage systems for storing digital data, and, more specifically to computer-based techniques for storing digital data in a volume of a storage system.

BACKGROUND

In the field of distributed computer systems, resources are made available for use by computer applications. Computer applications may require different computer resource types, such as central processing unit (CPU), memory, network, and data storage. Resources from multiple computer systems may be aggregated into one or more resource pools. Resource requests may include multiple resource types.

Selection of resources to satisfy resource requests is made by a scheduler. The scheduler makes decisions based on algorithms or rules. Typically, there is no specific format required for the rules the scheduler uses to make decisions.

Where resource schedulers exist currently, the rules they use are predefined to select a specific behavior or algorithm. This has the disadvantage of being difficult to specify or change scheduling behavior, and difficult to specify or change scheduling behavior for only some types of resources.

Existing distributed computer systems require that the requestor specify features or attributes that the required resource must exhibit. For example, if an encrypted data volume was required by the requestor, then details about the encryption cipher and the encryption key would need to be provided by the requestor. As resources typically have multiple features and attributes, their specification can be cumbersome and difficult to manage in large environments, often leading to inconsistent configuration and ultimately, incorrect behavior.

SUMMARY OF THE INVENTION

A method for provisioning a volume of data is disclosed. The method involves identifying a set of rules associated with the volume of data, wherein the set of rules includes at least two conflicting rules, prioritizing the at least two conflicting rules, placing the volume of data on a first computer system according to the prioritization, collecting performance metrics corresponding to the placed volume of data, computing a score based on the collected performance metrics, determining if the computed score is acceptable, determining that the placement is successful if the computer score is determined to be acceptable, and changing the prioritization of the at least two conflicting rules and placing the volume of data on a second computer system according to the changed prioritization if the score is determined to be unacceptable.

In an embodiment, the volume of data is placed on the second computer system only during hours when the second computer system is not used.

In an embodiment, the volume of data is placed on the second computer system during a period of time in which activity is relatively low.

Other aspects and advantages of embodiments of the present invention will become apparent from the following detailed description, taken in conjunction with the accompanying drawings, illustrating by way of example of the principles of the invention.

BRIEF DESCRIPTION OF THE DRAWINGS

Throughout the description, similar reference numbers may be used to identify similar elements. Additionally, in some cases, reference numbers are not repeated in each figure in order to preserve the clarity and avoid cluttering of the figures.

DETAILED DESCRIPTION

Figure 1:
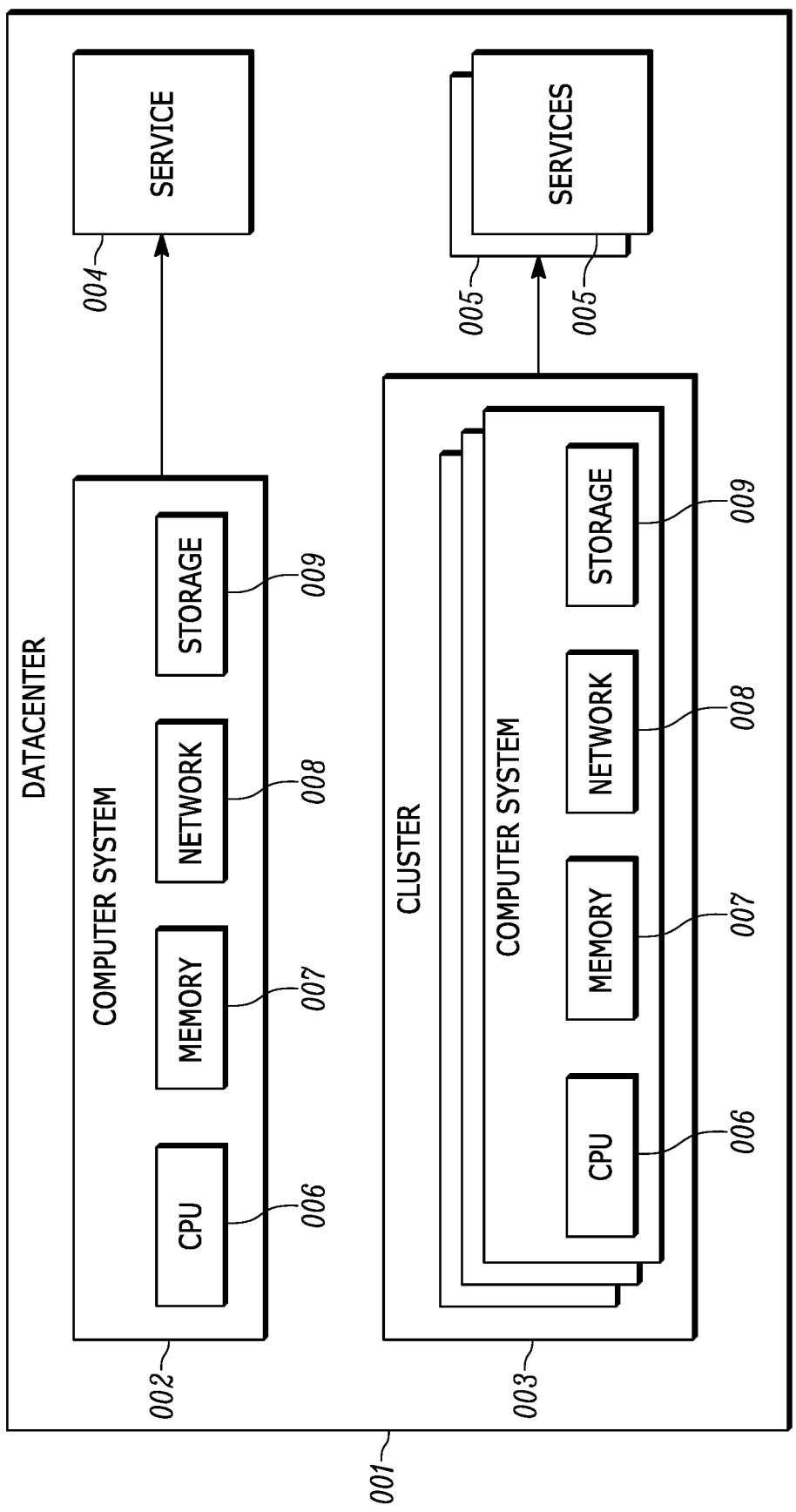
FIG. 1 illustrates computer resources that can be scheduled to provide services.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

The present invention relates generally to computer systems and methods for optimizing resource usage in distributed computer systems. The present invention may relate to methods for specifying rules for resource selection and feature enablement within computer systems having multiple resources of the same and differing types.

In an embodiment, the present application provides systems and methods for applying high-level business objectives to computer systems by translation of the objectives into rules, which on receipt of an external event, are then evaluated to produce system tasks required for implementation on relevant computer systems.

With the translation mechanism, the person or entity that specifies the high-level business objectives does not need to understand technical implementation details. Conversely, the computer system does not need to understand business objectives, rather only the tasks that must be performed to satisfy the objective requirements.

In an embodiment, the translation mechanism also allows for automated application of business objectives by computer systems.

Business objectives, objective translation rules, and implementation tasks can all be defined in external systems.

In an embodiment, a rulebase stores the rules generated by the business objective translation. The rules define what must or must not happen to satisfy the objective, and to what types of computing object the rule should apply to.

In one embodiment, a database of storage implementation rules that allows the rules engine to evaluate and codify business rules in terms of technical implementation operators for a storage system is disclosed. The database may include functionality of the storage system and may allow the scheduler to manage the data plane of a storage system. The list of technical implementation operators includes but is not limited to: the provision of a volume including the attributes of the volume such as the name and size of the volume of data; the data protection attributes of a volume such as the utilization of one or more encoding methods that add redundancy to the data within a volume, or encode data in a format where the data is recoverable if a given fraction of the data is no longer accessible given the remaining fraction of the data; the data availability attributes of a volume such as the utilization of one or more replication methods where a copy of the data is maintained on other computers or systems other than the system holding the original data; the data availability attributes of a volume such as the service definitions of the replication methods available to a storage system including, for example, methods which may replicate data in real time ensuring that a copy of the data is always consistent with the source data as well as methods where data in a copy is only eventually consistent; the data security attributes of a volume such as the use of cryptographic methods which are implemented to scramble the data with a key such that the data is only later accessible by decoding with the same key; the data security attributes of a volume such as the use of access control mechanisms to restrict access to the volume to specific computer users or specific computer systems; the data reduction attributes of a volume such as the use of data compression methods to reduce the size of the data that needs to be persisted; the data reduction attributes of a volume such as the use of the data deduplication methods to remove duplicate copies of the data; the data caching attributes of a volume where commonly used data within the volume is retained in a faster medium, for example, computer system memory or other fast storage medium, such that access to the data is faster than would be possible from the storage medium where the data is persisted; the methods and technical systems that are available to access a given volume including, for example, the formats and protocols used to access a volume through a storage system; and the attributes of different classes of storage media that are available in a storage system, including attributes such as the speed of the media, the format and access protocol to the media, the durability and expected lifetime of the media, and any constraints that may apply when accessing the media.

In addition, the database may include links of business operators to the technical operators of the storage system such that the rules engine can parse the business operators and identify the appropriate attributes and actions to be taken by the storage system. Examples of links between business operators to technical operators may include but are not limited to:

"secure" to identify cryptographic methods;

"highly available" to identify replication methods;

"immediately available" to identify synchronous or highly consistent replication;

"allow access" to identify security controls for access control mechanisms;

"fast" to identify the caching methods used or the speed of the disk media where the volume is placed; and "archive" to identify the type of disk media to select.

In another embodiment, other domain specific databases can be added by the operator of the computer or storage system to allow the rules engine to process parameters for system functionality or computer system resources that have not yet been defined. This allows the technique to be extensible to cover the development of new technologies that have not been released as products yet.

In an embodiment, external events such as resource requests and environmental changes are received by a scheduler and a rules engine. The scheduler is responsible for assigning computer resources once the rules engine has determined what, if anything, must be changed, and according to constraints set by the rules engine. The scheduler will attempt to make best use of computer resources according to placement rules set by the rules engine.

In an embodiment, the scheduler creates implementation plans for changes that the rules engine determines must be applied to the environment. Implementation plans are comprised of a set of tasks that must be executed on specific computer systems. The implementation plans optimize task execution order to manage dependencies and to allow tasks to run in parallel where possible.

In an embodiment, the rules engine evaluates system inputs such as computer resource requests and environmental factors such as available computer hardware resources. The rules engine is constantly evaluating inputs and can make decisions based on the translated business objectives without operator intervention. The decisions the rules engine takes may be accompanied by constraints that must be satisfied in order for the decision to be implemented successfully.

In an embodiment, the rules engine is dynamic and can adapt a running environment based on new or modified business objectives.

In an embodiment, the rules engine can adapt a running environment based on changes to environmental factors such as failing computer components or systems.

In an embodiment, the rules engine can optimize the environment based on rate of change, such as by pre-expansion of computing capacity when growth thresholds have been exceeded. Thresholds can be defined statically or dynamically based on rate of change.

In an embodiment, the rules engine can also optimize the environment based on resource usage. This includes both expansion and reduction of computing capacity based on observed usage.

In an embodiment, the rules engine integrates with third party computer systems or computer code at runtime to make decisions based on data external to the system.

In an embodiment, the scheduler integrates with third party computer systems or computer code at runtime to make decisions based on data external to the system or to notify external systems of progress. This may include calling external systems to retrieve resource utilization statistics that may influence scheduling decisions or change management systems to notify on change completion.

In an embodiment, computer objects are assigned metadata that can be used by the rules engine and the scheduler for making decisions.

Computer Resources

FIG. 1 illustrates computer resources that can be organized to provide services. A computer system 002 has a plurality of resources, including but not limited to CPU 006, memory 007, network 008, and storage 009. CPU is the processing capacity defined by the number and speed of the computer system's central processing unit(s). A plurality of computer systems can be grouped or organized into clusters 003. A plurality of computer systems or clusters can be organized into a datacenter 001. Datacenters can be owned and operated by the operator of the computer system, or may be operated as a service by a 3rd-party vendor. Within a datacenter, a datacenter operator can organize one or more resources to create services 004, 005, where a service provides a specified function based on an operator defined specification. The services may be further grouped and treated as functionally equivalent to an individual computer system's resources when being processed by the scheduler.

Rules Engine

Figure 2:
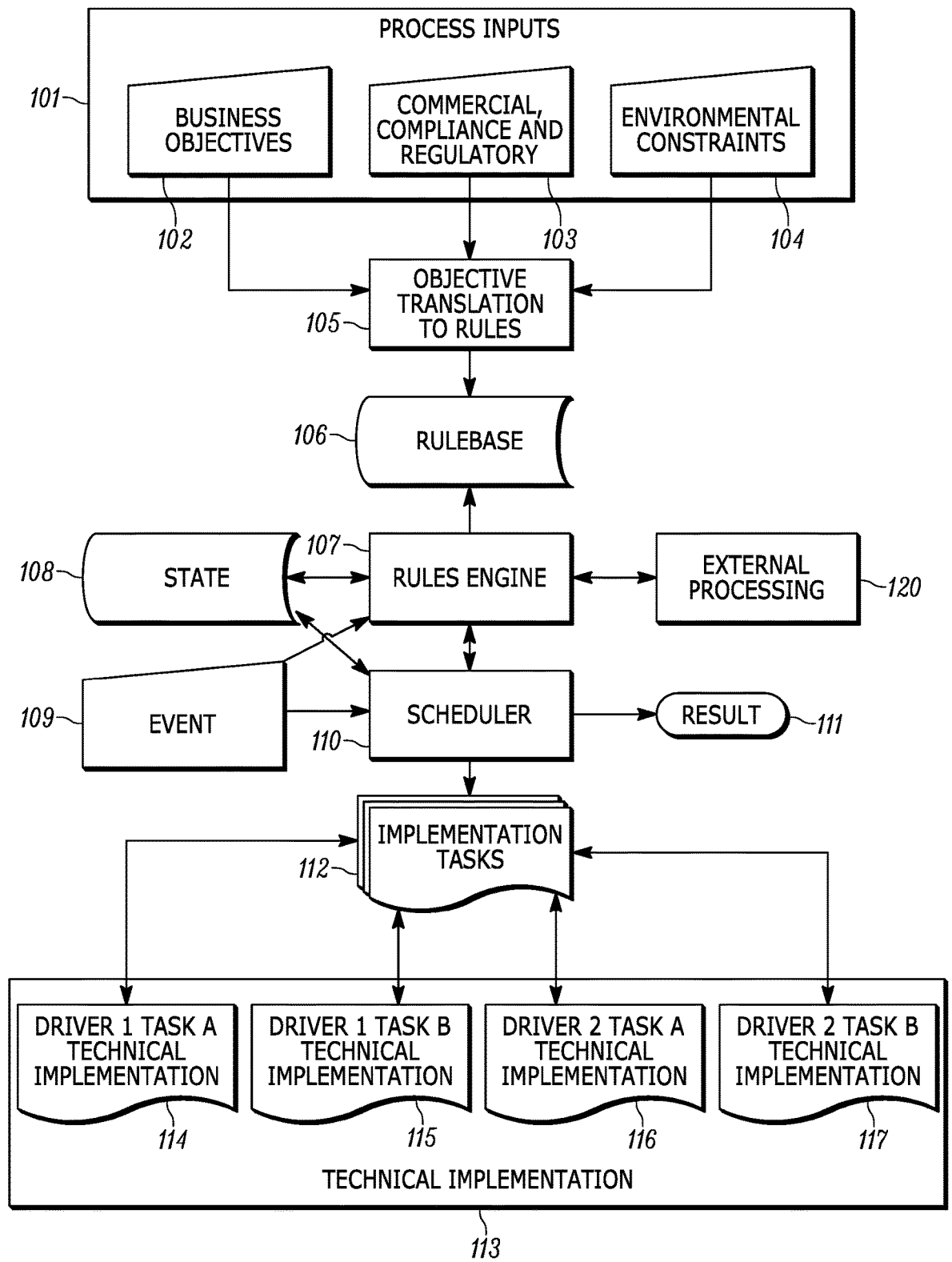
FIG. 2 illustrates an example embodiment of the overall design of the rules engine and how the rules engine integrates with the scheduler.

FIG. 2 illustrates the overall design of a system that incorporates the rules engine. In an embodiment, the rules engine 107 runs on a single computer system. There is also a single scheduler 110 running. Both the rules engine and the scheduler receive state 108 changes and events 109.

State 108 describes the current system environment, or changes to the system environment. The system state may be used by the rules engine or scheduler to trigger resource allocation changes. Examples of system state changes include the addition of new system resources, updates to system resource usage, or failed system resources.

Events 109 may be resource requests, such as to run a workload, or to provision data storage. Events may also be notifications about changes within the system, such as the creation, update or deletion of a rule in the rulebase. Events may be user-generated or computer-generated.

The rules engine 107 evaluates events and state changes recursively against the rulebase 106.

The rules engine 107 may send events and state changes to external systems for processing 120. This gives the advantage of allowing the rules engine to process complex logic without requiring the logic to be held within the computer code of the rules engine or within the rules in the rulebase. In addition, this allows the rules engine system to be extensible without modification of the rules engine.

If the rules engine 107 determines that a change to the existing state 108 is required, the rules engine notifies the scheduler 110 to make the change.

In this embodiment, the scheduler 110 is designed to run on a single computer in a distributed system. The scheduler receives resource requests as events or by the rules engine. Resource requests include the attributes and constraints that must be satisfied in order to service the request. The scheduler is responsible for making resource allocations that make the most efficient use of the resources available. Where there are no resources available that meet the request's required attributes or constraints, the scheduler will respond with a failure result 111.

If the scheduler is able to satisfy the request's attributes and constraints, the scheduler produces implementation tasks 112, which are then validated again by the rules engine 107 and once all issues are resolved sends the implementation tasks to the drivers 114, 115, 116, 117 for technical implementation 113.

In an embodiment, the drivers 114, 115, 116, 117 are responsible for executing atomic actions, for example, provisioning a data volume on a specified computer system. There can be multiple drivers, each responsible for implementing one or more atomic actions. Drivers can either be on the same machine as the scheduler or on remote machines. The scheduler uses standard network protocols to send messages to the drivers, and the scheduler will report the result 111 of executing the implementation tasks 113.

The rules engine's inputs 101 with objective translation to rules 105 can be running on all computer systems participating in the distributed system. These different inputs may come through different protocols with different encodings.

Business objectives 102 can be specified in a high-level, natural language, as can commercial, compliance, or regulatory objectives 103. Other types of objectives may also be provided in a similar fashion. An example business objective might be "Production data is important and needs to be always available." A regulatory objective might be "Customer data must be encrypted."

Environmental constraints 104 can be specified in a similar fashion to business objectives 102. Environmental constraints can be used to restrict placement based on environmental factors, such as resource availability.

In an embodiment, new or updated objectives or environmental constraints are translated to rules 105 (see also FIG. 4) and then stored in the rulebase 106.

In an embodiment, the rules engine 107 will re-evaluate the rulebase against the current state and inform the scheduler if any changes to the current state are required.

Scheduler

Figure 3:
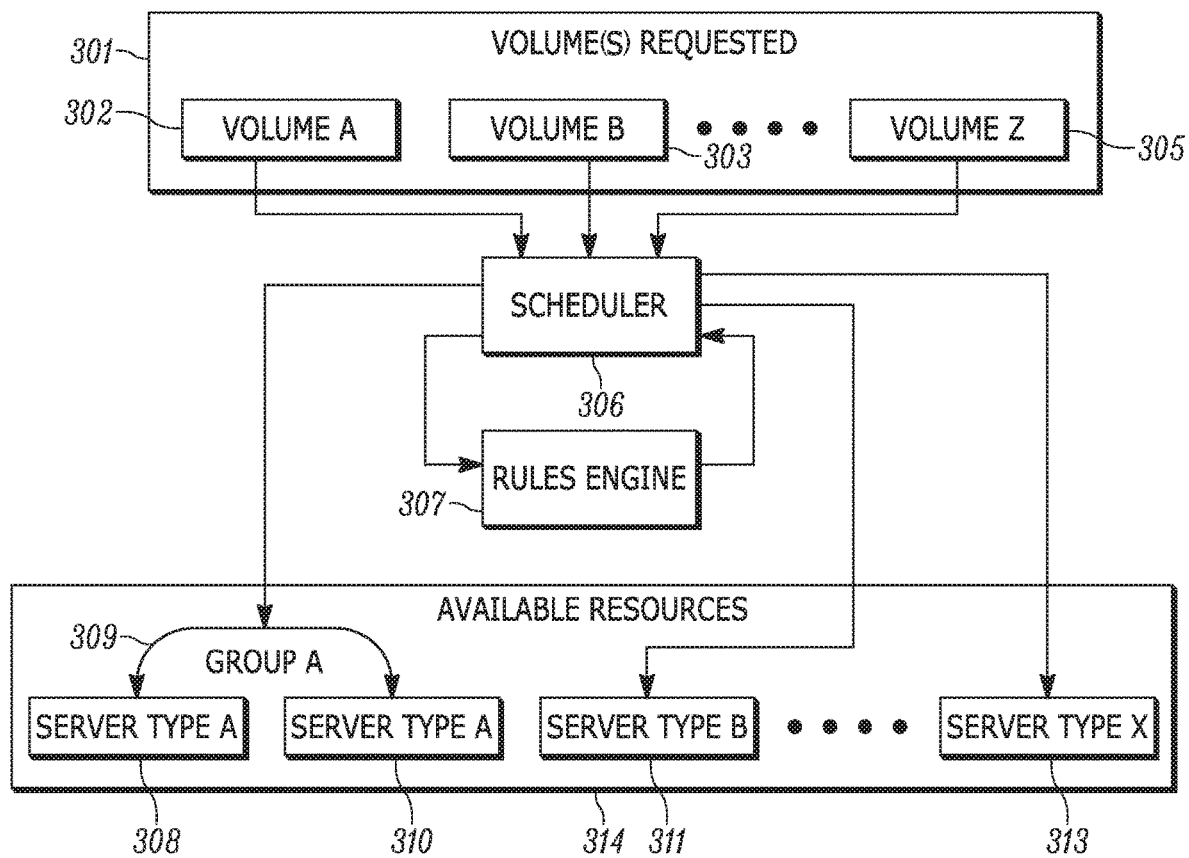
FIG. 3 illustrates an embodiment of the rules engine and scheduler when used to provision data storage.

FIG. 3 illustrates an embodiment of the rules engine and a scheduler when used to provision data storage volumes. In this example embodiment, data storage volumes are being requested, at 301. Data storage volumes are single accessible storage areas that can be provisioned on a computer system for storing application data. Storage volumes may be made up of disk drives or other storage media that are physically attached to the computer system, or made up of remote storage media that are attached to the computer system over networks or other methods.

In an embodiment, the scheduler 306 receives the individual storage volume requests as events 302, 303, and 305. The scheduler asks the rules engine 307, that given the request details, what changes need to be made to the environment and what attributes and constraints must be satisfied in order to complete the request.

In an embodiment, the scheduler will evaluate the change, the attributes, and the constraints against the running environment, including the available resources 314, and attempt to satisfy them in the most efficient way possible.

In an example, Volume A 302 is being requested. Volume A might have attributes such as size=10 GB, and application=database. When the request is made to the scheduler 306, the scheduler sends a request to the rules engine 307. The rules engine may have a rule that constrains databases to run only on disk type=SSD, and returns that constraint to the scheduler. The scheduler then uses this constraint to find the computer systems in Group A 309, that have disks of type=SSD. The scheduler may then choose which of the two computer systems 308, 310 has the most resources free and then select that system for provisioning the data volume.

Input Processing

Figure 4:
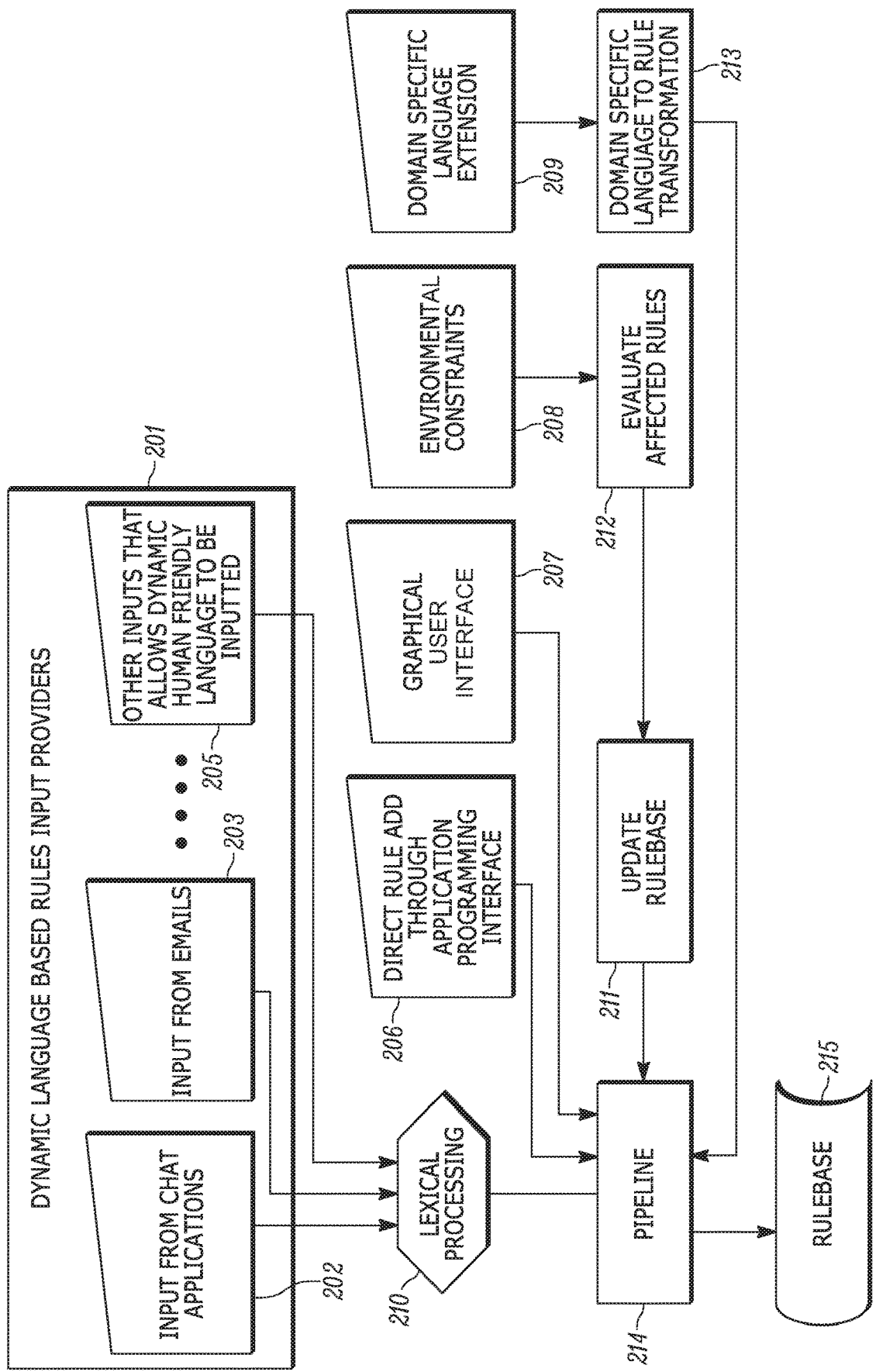
FIG. 4 is a flow diagram that illustrates how different inputs are processed when adding new rules.

FIG. 4 is an example of a flow diagram that describes the logical components in one embodiment. The example of FIG. 4 illustrates how the different inputs are processed when adding new rules.

Components in the dynamic language based rules input providers 201 provide semi-natural language input capabilities where users would be interacting with the system through bots in computer-based chat applications 202, emails by replying or sending emails 203 with several words about desired rules, or other communication or input methods 205 that are easily accessible to non technical users.

In an embodiment, these inputs are then sent to lexical processing unit 210 that parses the user's input and validates initial syntax. If the lexical processing unit cannot parse the input, the lexical processing unit informs the user about parsing error.

In an embodiment, each input interface can serve as a bidirectional communication channel where a user can get current information about existing rules.

Besides dynamic language input providers 201, rulebase 215 also accepts rule create or update requests through standard application programming interfaces 206, such as Hypertext Transfer Protocol (HTTP), Remote Procedure Call (RPC), and gRPC (GitHub RPC). These input methods would typically use structured input formats that do not require lexical processing.

In an embodiment, a graphical user interface 207 provides a user with certain tools such as autocomplete functionality, detailed descriptions of selected rule features and can instantly detect dependent rules and inform the user about possible improvements in rule execution order.

In an embodiment, environmental constraints 104 (FIG. 2) and 208 (FIG. 4) are a type of rule that determines placement constraints based on the discovered environment. For example, an environment scanning submodule 404 (FIG. 5) may determine that a computer system is not, or is no longer, suitable for running a particular process. When an environmental constraint is added or changed, existing rules must be re-evaluated 212, and any changes to those rules must be updated in the rulebase 211.

In an embodiment, one of the key rulebase input providers is a domain specific language extension 209 that provides a flexible way to describe resource specific rules. In one embodiment, the domain specific language extension includes a database of storage implementation rules that allows the rules engine to evaluate and codify business rules in terms of technical implementation operators for a storage system. The database may include functionality of the storage system and may allow the scheduler to manage the data plane of a storage system. The list of technical implementation operators includes but is not limited to: the provision of a volume including the attributes of the volume such as the name and size of the volume of data; the data protection attributes of a volume such as the utilization of one or more encoding methods that add redundancy to the data within a volume, or encode data in a format where the data is recoverable if a given fraction of the data is no longer accessible given the remaining fraction of the data; the data availability attributes of a volume such as the utilization of one or more replication methods where a copy of the data is maintained on other computer or systems other than the system holding the original data; the data availability attributes of a volume such as the service definitions of the replication methods available to a storage system including, for example, methods which may replicate data in real time ensuring that a copy of the data is always consistent with the source data as well as methods where data in a copy is only eventually consistent; the data security attributes of a volume such as the use of cryptographic methods which are implemented to scramble the data with a key such that the data is only later accessible by decoding with the same key; the data security attributes of a volume such as the use of access control mechanisms to restrict access to the volume to specific computer users or specific computer systems; the data reduction attributes of a volume such as the use of data compression methods to reduce the size of the data that needs to be persisted; the data reduction attributes of a volume such as the use of the data deduplication methods to remove duplicate copies of the data; the data caching attributes of a volume where commonly used data within the volume is retained in a faster medium, for example computer system memory or other fast storage medium, such that access to the data is faster than would be possible from the storage medium where the data is persisted; the methods and technical systems that are available to access a given volume including, for example, the formats and protocols used to access a volume through a storage system; the attributes of different classes of storage media that are available in a storage system including attributes such as the speed of the media, the format and access protocol to the media, the durability and expected lifetime of the media, and any constraints that may apply when accessing the media.

In addition, the database may include links of business operators to the technical operators of the storage system such that the rules engine can parse the business operators and identify the appropriate attributes and actions to be taken by the storage system. Examples of links between business operators to technical operators may include but not limited to:

"secure" to identify cryptographic methods;
"highly available" to identify replication methods;
"immediately available" to identify synchronous or highly consistent replication;
"allow access" to identify security controls for access control mechanisms;
"fast" to identify the caching methods used or the speed of the disk media where the volume is placed; and
"archive" to identify the type of disk media to select.

In another embodiment, other domain specific databases can be added by the operator of the computer or storage system to allow the rules engine to process parameters for system functionality or computer system resources that have not yet been defined. This allows the technique to be extensible to cover the development of new technologies that have not been released as products yet.

In an embodiment, changes to the rulebase are queued in a pipeline 214, which ensures that changes are applied sequentially in the order that they arrive.

The rulebase 215 is a database that stores the processed rules.

Rulebase

Figure 5:
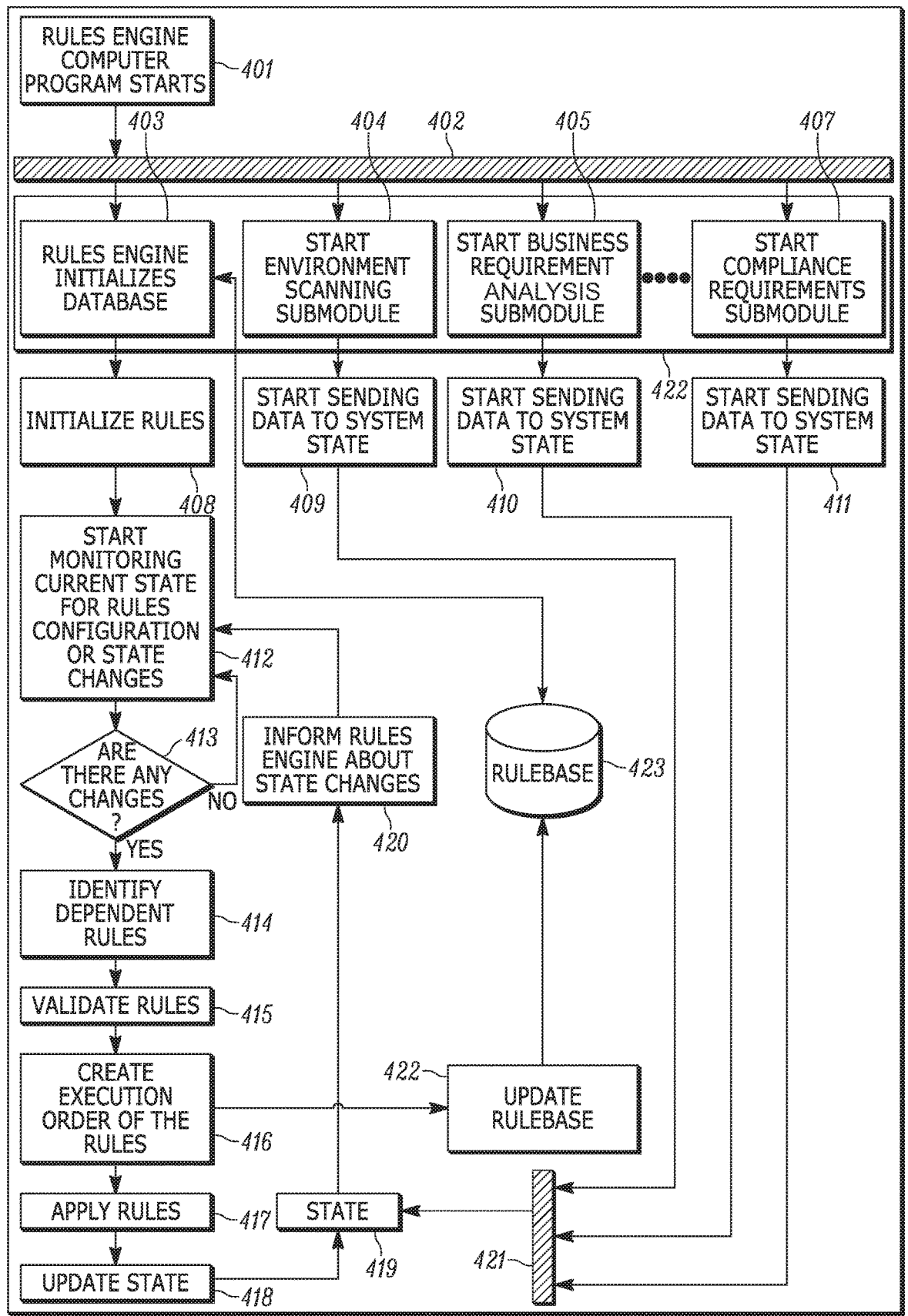
FIG. 5 is a flow diagram that illustrates an embodiment of a rulebase state management system, which illustrates a bootstrap process of the rules engine and an event loop that performs continuous updates based on state changes.

FIG. 5 illustrates an embodiment of a rulebase state management system 400 having a rulebase platform that can work with multiple sources of data and that constantly re-evaluates its own state. The rulebase consists of any number of rules stored in the rulebase 423 and any number of data provider or gathering submodules 404, 405, 407. When a rules engine computer program starts 401, it is responsible for initializing the rulebase and all of the data provider submodules. The rules engine is started alongside the scheduler. The scheduler is responsible for actual task implementation. During startup procedures, the rules engine is responsible for invalidating all existing rules stored in the rulebase and rebuilding the rulebase from scratch. This is necessary since the rules engine has no knowledge of how the environment or rules may have changed during the shutdown period.

The current rulebase architecture allows for parallel bootstrapping 402 of all data gathering submodules 404, 405, 407. Bootstrapping is the process of starting the system and performing any initialization tasks. Using computer language specific features that enable creation of lightweight processes, the rules engine can efficiently collect data in an asynchronous way. These submodules can either be running inside the main rules engine computer program or in a separate computer that is running in the same datacenter, or a different datacenter in a different geographical location.

In an embodiment, database initialization 403 is required to enable rulebase persistence. There is no restriction on database type for storing rules, however, since rules are dynamic, a document-based or key/value type database with a flexible data schema is preferred. Each rule is assigned a unique identifier that is then used to update or delete specific rules. This unique identifier is used as a key in the database and the rule payload is the value.

In an embodiment, the environment scanning submodule 404 is responsible for gathering data about the current environment in which the computer program is running. There can be multiple different environments such as bare-metal servers (e.g., operating systems are running directly on hardware), virtual machines (e.g., operating systems are running on hypervisors), and containers (e.g., applications running in sandboxed environments). There can be more types of environments and the environment scanning submodule 404 is responsible for identifying these environments. Environment information is collected and sent as state for later use by the rules engine.

The environment scanning submodule 404 may also be able to apply unstructured heuristics to capture key variables like disk speed and capacity. These heuristics and variables do not need to be pre-defined and can be learned from the environment or system being scanned. The heuristics may, by way of example, set a variable defining a disk resource as "fast" if it determines it is fast in comparison to other disks in the system. This variable could later be used to satisfy a request constraint such as "Databases should be on the fastest disks."

The business requirement analysis submodule 405 is responsible for producing business related rules. By analyzing multiple channels such as text based input systems, direct API, graphical user interface, domain specific language inputs or any other data source, it can then create rules that influence scheduler behavior. This influence can include placing boundaries on available resources to reduce costs, ensure asynchronous replication to slower computer data disks while preserving fast computer data disks (which are usually more expensive) to active workload.

The number of active submodules is not limited. As long as separate submodules implement a common communication protocol they are allowed to join the rulebase program and provide either new rules, rule updates or inform about state changes.

In an embodiment, a compliance requirements submodule 407 is responsible for producing compliance related rules such as data locality, archives for a specified period of time (to enable auditing). These rules could then be grouped into layers, moving data into cheaper storage tiers. Typically, this is a manual process that requires many man-hours to identify data required by compliance and then migrating it into cheaper data storage systems.

Rule initialization 408 is a step implemented to validate rules that were stored inside the rules engine database. Since the rules engine computer program version can be updated, rule interpretation can be changed. In this step, it is also evaluating the current environment which is present at initialization time.

In an embodiment, every submodule 409, 410, 411 of the rules engine has to provide data to the rules engine state. The rules engine has multiple different data ingress interfaces which provide appropriate access to different submodules.

The environment scanning module 404 runs inside the rules engine computer program and therefore handles data updates internally in a very performant way.

The business requirement analysis submodule 405 can be running on every computer system in a distributed system and therefore uses protocols that are designed for remote communications to provide data updates to the rules engine state 419.

The compliance requirements submodule 407 runs in a similar way as the business requirement analysis submodule 405 and uses protocols designed for remote communication. Each submodule is responsible for data durability and therefore has to perform retries on failure.

A data aggregation point 421 is responsible for unifying data formats. Multiple submodules can send data in different protocols or encodings. This step is needed to read and decode data from incoming connections and save it into the rules engine state 419.

A monitoring step 412 allows reaction to rules or environment changes. This step is critical to build a complex rules engine with multiple levels of inter-dependent rules. The monitoring step may opportunistically evaluate to ensure optimal placement and policy enforcement across the environment.

A change checking step 413 allows the rules engine, depending on the database implementation of the rules engine state, to react to changes to the environment or rules. If the state database provides a subscription mechanism to get notification of data changes, then the rules engine uses this mechanism to subscribe to change events, otherwise (if the database doesn't support this functionality), a separate process thread is created that constantly queries the database and checks for changes.

A dependent rules identification step 414 is performed when rules change or during the rules engine initialization process. In this step, the rules engine is checking which rules might be dependent on other rules. As an example, there could be two rules: encryption and compression. If a system would try to compress already encrypted data it would fail to reduce the size due to the nature of encryption, therefore, data compression should be done before encryption to achieve desired results.

A rules validation step 415 is performed after identifying dependent rules. This step is needed to check whether the rule is valid. Rule syntax checking is performed in the submodules and then at aggregation point 421. This step is required for deeper analysis of the rule where data gathered from dependent rules can be combined with the current environment in which the system is running. An example for this step can be a data replication rule that enforces replicating a data volume to another geographical location. The rules engine can then check data provided by the environment scanning submodule 404 to verify that the system has at least two geographical locations and therefore replication to another geographical region is feasible. If this verification results in a negative outcome, this rule and its dependent rules will be marked as inactive or it will prohibit new data volume creation depending on supplied policies. This functionality can strictly enforce business requirements and reduce damage done by outages, wrong user decisions, or other unknown factors.

An execution order creation step 416 is the next step after identifying dependent rules 414 and validating rules 415. In this step, the rules engine analyzes the rule's dependency tree and optimizes execution order based on predefined templates. These templates can either be strict, for example, backup data only after compression or an algorithm in a form of source code can be supplied to resolve execution order. For example, a script written in a popular programming language such as Python can be supplied, which will be supplied with the rules and environment, and the output data of executing that script will be used to resolve dependencies. This functionality allows complex dependency resolution logic to be added at runtime without introducing business related complexity into the main source code of the rules engine, since different organizations have different problems and different solutions to those problems. This process starts the apply rules step 417 and the update rulebase step 422, which run in parallel.

The apply rules step 417 is a process created by the rules engine that will trigger state evaluation. The apply rules step is needed to compute required updates (if any required is determined by the rules themselves).

The update rulebase step 422 is a step in the rules engine state management where the system is storing rules that were formatted, their dependencies identified, and the execution order created. This is the final stage of adding or updating rules.

An update state step 418 is a step that affects rules engine state. In this step, the system is calling the state database directly, since existing rules were updated and therefore triggering a new state change event that may result in actions taken by the scheduler (the rules engine state 419 is also shared with the scheduler).

In an embodiment, the rules engine state 419 is a shared database that is being used by the rules engine and the scheduler. The rules engine state is constantly being updated by various other submodules, the scheduler, and the rules engine itself. This database has to provide fast access to data. For example, a node that has an active rules engine and a scheduler process can keep a copy of the shared state in memory for performance gains. Typically, this data can be recreated from scratch by the data gathering submodules in a case of system failure. Distributed, eventual consistency type database is recommended to provide faster recovery in a case of node failure.

The rules engine database (rulebase 423) is the database which is used to store rules. All rules that are added to this database have to be preprocessed, it has no logic to do any changes to the rules. Typically, this database needs high availability.

Identifying Dependent Rules

Figure 6:
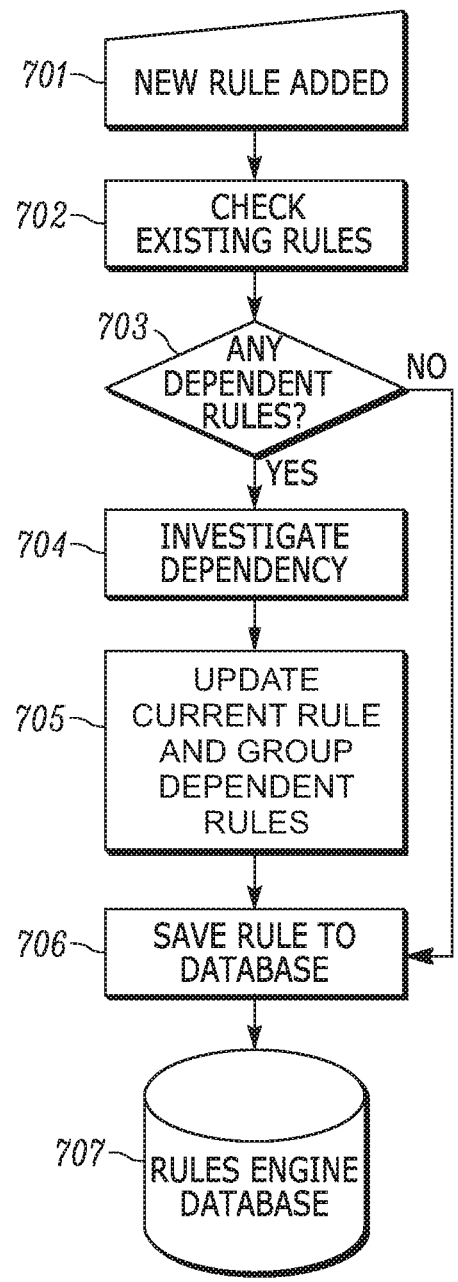
FIG. 6 is a flow diagram that illustrates an example of how the rules engine resolves dependencies.

FIG. 6 is an example that illustrates how the rules engine resolves dependencies between rules. When a new rule is added to the rules engine at block 701, a check is performed at block 702 against existing rules, and the check is determining whether the new rule might directly or indirectly affect other already stored rules.

At decision point 703, if during this check the rules engine determines that no rules can be affected by this new addition, the rules engine skips to the last step, block 706, and saves the rule to the rulebase database of rules engine database 707.

If during the check at block 702, any dependent rules are identified at decision point 703, the rules engine proceeds to start a dependency investigation at block 704. During the investigation, the rules engine is trying to identify how to improve the current rulebase configuration. For example, this investigation can include checking predefined best practices for rules, such as choosing highest data compression level for backup storage, and selecting correct order for rules such as by ensuring compression before data encryption (data encryption is a process of scrambling data so only authorized parties can decrypt data and read it).

After rule investigation, at block 705 the rules engine updates the current rule and groups dependent rules so later it is faster to identify which rule is affecting other rules. Once updates are finished, at block 706, the rules engine saves changes to the rulebase database.

Environment Scanning Submodule

Figure 7:
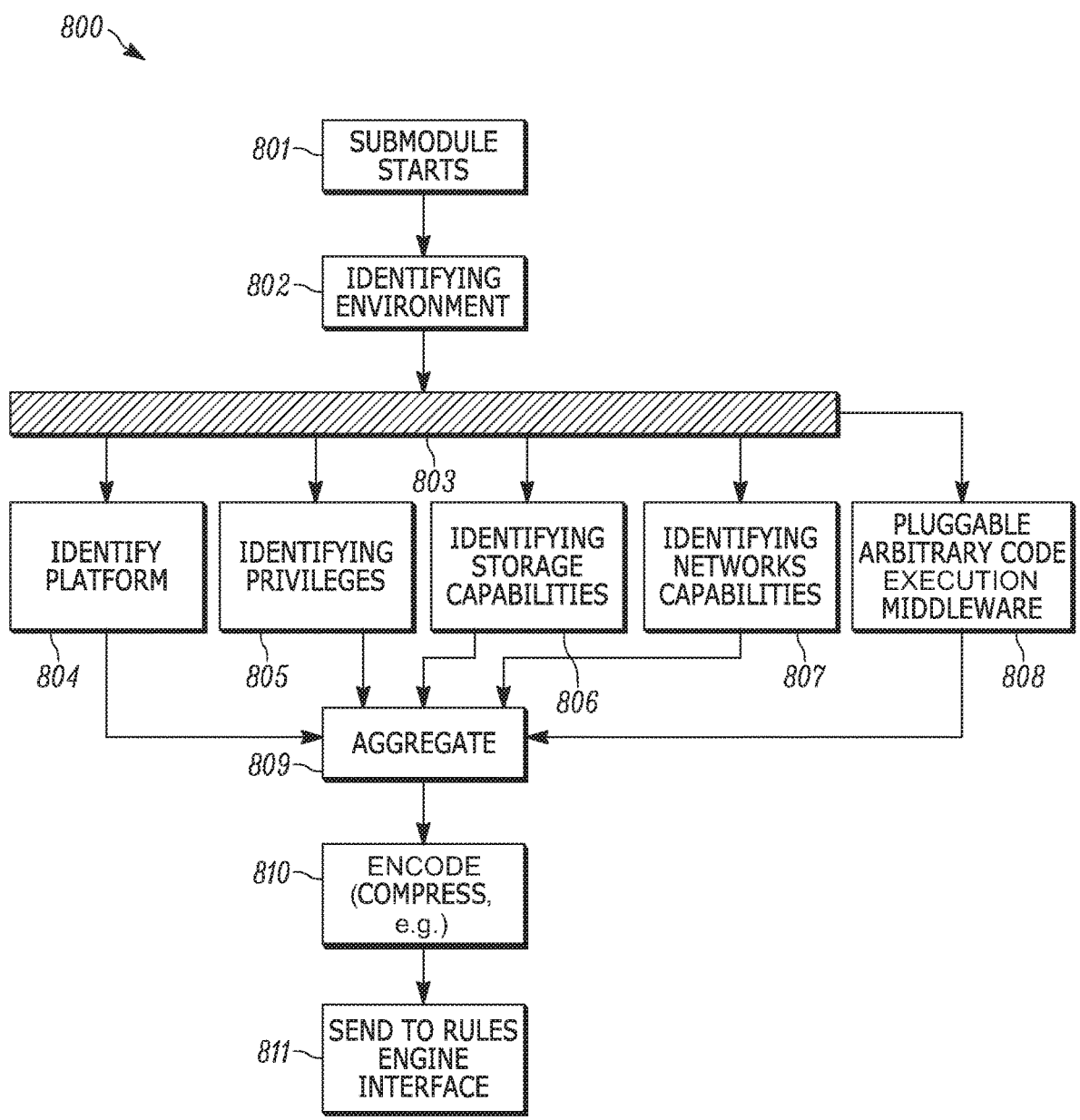
FIG. 7 is a flow diagram that illustrates an example of the environment scanning submodule of the rules engine.

FIG. 7 illustrates an example of the environment scanning submodule 800 of the rules engine. Submodules are required to provide additional context to the rules engine. There may be many types of submodules that collect data about different types of computer systems. The computer system that a submodule is scanning is not necessarily a single computer, it can be a cluster of computers controlled by a third party platform. Submodules can be running either in the environment or outside, and submodules support different types of configurations.

When an environment scanning submodule starts, at 801, it begins by identifying the environment, at 802. In an embodiment, the environment identification process consists of several parallel 803 tasks.

The first task is identifying the platform 804 itself. There are an increasing number of platforms available today and these platforms provide easier ways to manage large numbers of computers. Identifying the platform is an important step since having information about the platform details will help the rules engine correctly configure its drivers. Platform identification can be done in several ways. One of the easiest options involves looking for environment variables supplied to the process or looking for a configuration file on the computer hard disk.

Another task in the environment scanning module is identifying privileges 805. Depending on deployment and user preferences, the rules engine can either be granted or not granted certain privileges, for example, access to resource quotas, limits, and the right to move workloads from one computer to another. All this information has to be gathered and sent to the rules engine interface, then the correct driver interprets the privilege information.

Storage capabilities identification 806 depends on the system that the program is running in. For example, storage capabilities when the system is running in a platform that manages a cluster of computers and has rights to attach remote storage capabilities can be either increased or decreased on demand. If a system is running on a single computer, usually storage capabilities are those provided by the hard disks attached to computer.

Network capabilities identification 807 scans for availability of required ports. Since the rules engine and the whole system that is using the rules engine has certain network requirements, this submodule has to ensure that those requirements are met. Some systems provide options to dynamically update network configuration, this information is also relevant to the rules engine.

Pluggable arbitrary code execution middleware 808 is one of the novel ways to gracefully deal with the custom platforms on which a rules engine is deployed. This part of the environment scanning submodule can safely execute custom source code that can be written specifically for the targeted system to gather the most detailed information about the environment. One of the example uses cases can be identifying custom platform capabilities where only the company that operates it knows how to get required information, therefore a custom code could be written that would constantly be used to check current system state.

An aggregation point 809 in the environment scanning submodule 800 is where the application is combining data from multiple sources into a single format, then optionally encodes 810 (e.g., compresses) the data for network transport and sends the data to the rules engine ingress interface, at 811.

Rules Engine Behaviour in a Cluster

Figure 8:
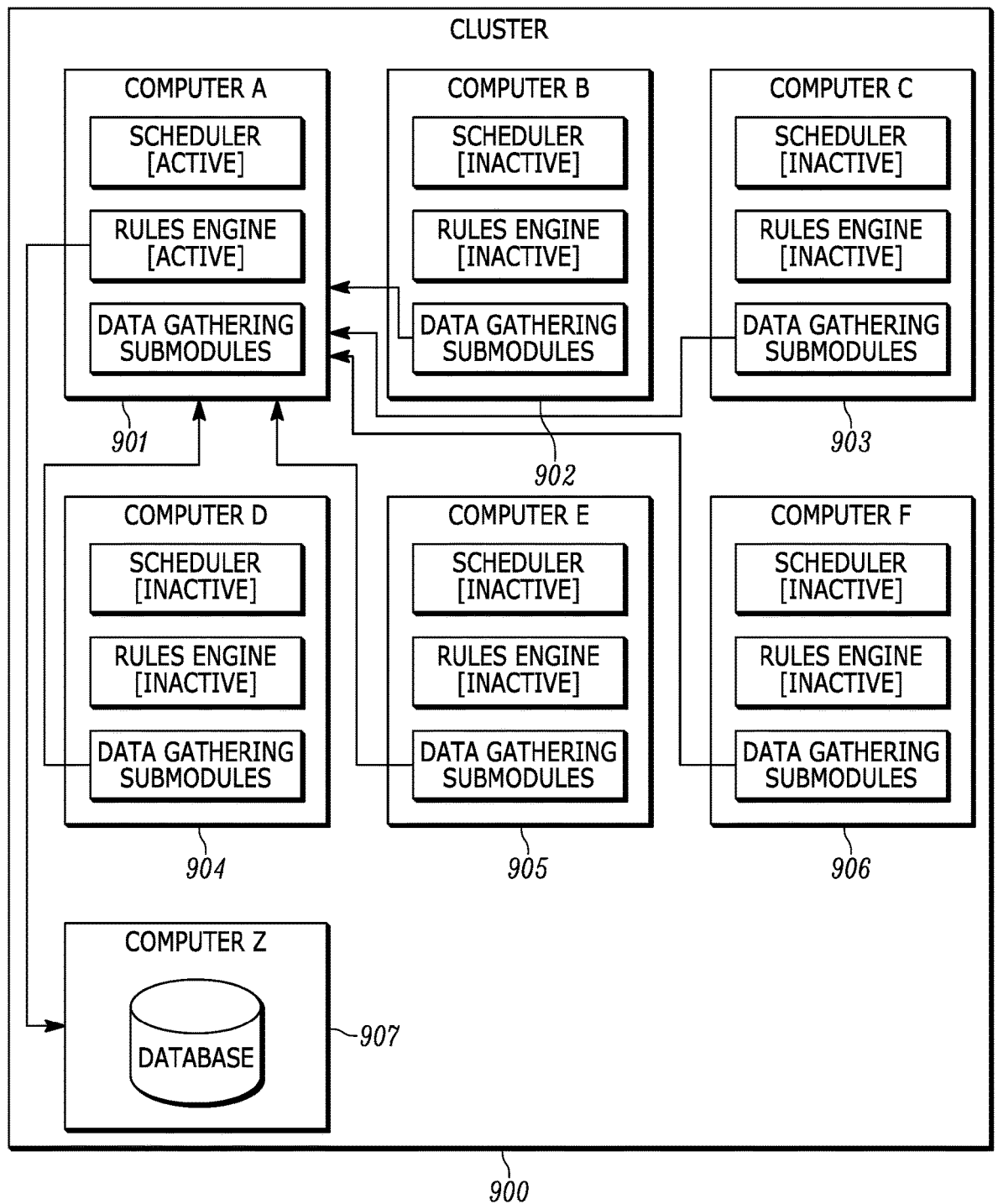
FIG. 8 illustrates an example of how the rules engine works in a cluster of six computers.

FIG. 8 illustrates an example of how the rules engine works in a cluster 900 of six computers (e.g., computer nodes 901-906). This number of computers was chosen only to illustrate behavior and this system is not limited to use this number of computer nodes. If needed, the cluster can have more than a thousand computer nodes. This diagram also includes the scheduler component which is running together with the rules engine and uses the rules engine to verify implementation plans or to get events from the rules engine that could trigger computer resource rescheduling or any other action that the scheduler is capable of implementing. The cluster also includes a computer node 907 that stores a database.

In the embodiment of FIG. 8, one computer node 901 is different from the other computer nodes 902-906 in a way that only node 901 has an active scheduler and rules engine. All the computer nodes 902-906 that are added to the same cluster are participating in a consensus algorithm that results in electing a leader node.

Once a leader node is elected, the leader node activates the rules engine and the scheduler. Other nodes are then waiting for the next leader election which will be triggered once the current leader resigns or goes offline. Since there is only one active scheduler in a cluster at a time, and only the scheduler accesses the rules engine, the rules engine does not need to be active on multiple nodes concurrently.

Each computer node (e.g., server) also runs data gathering submodules that are responsible for keeping up-to-date state in the rules engine. The rules engine has to be notified about computer cluster changes (e.g., nodes joining and leaving), hardware changes, and available resources in geographical zones. In the example of FIG. 8, only the active rules engine from computer A 901 has write access to database 907 and is saving all data gathered from the cluster. This technique for updating computer cluster state from a single node that is being elected by the rest of the computers through a consensus algorithm avoids data race conditions (data race is a term used to describe when two processes are trying to manipulate the same piece of information at the same time and are not aware of each other, this can result in corrupted data). This technique also serves as a way to detect node failures through an indirect route, e.g., missing updates. When a scheduler or rules engine detects that the continuous stream has stopped, an investigation task can be started to detect a cause for the stop (e.g., node failure, network failure or it could have happened due to multiple other reasons), nor rules engine nor scheduler is performing this investigation task.

The database 907 used by the rules engine can be of any type, however, a schema-less database is preferred due to the dynamic nature of gathered data. A schema-less database does not impose a structure on the type of data that is stored within it, allowing new data types to be stored without database reconfiguration. The database is used to store rules and state sent by the rules engine.

Multidimensional Rules

Figure 9:
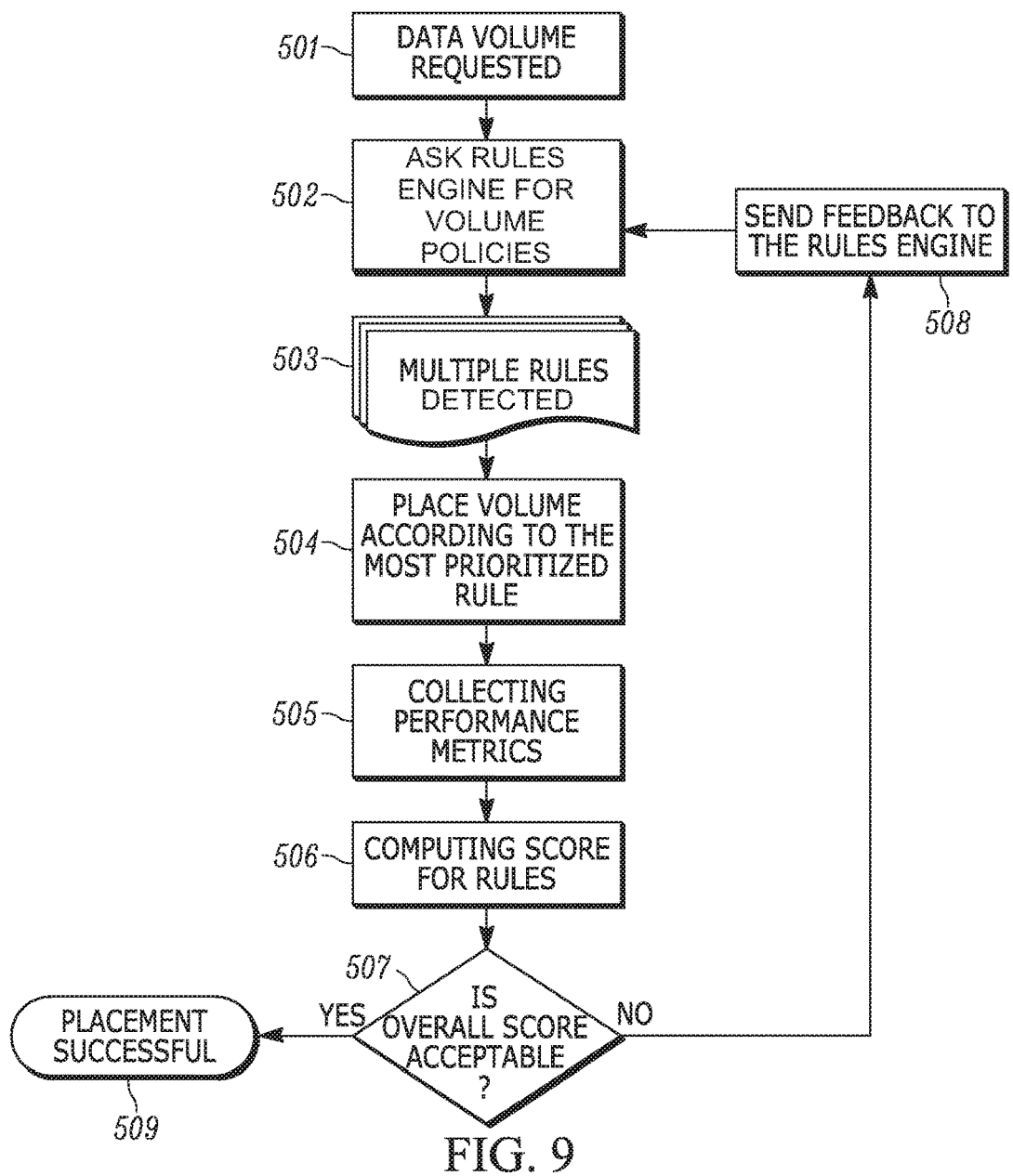
FIG. 9 illustrates an example of how multi-dimensional rules influence data volume provisioning and continuously work on enforcing rules.

FIG. 9 illustrates an example of how multi-dimensional rules influence data volume provisioning and continuously work on enforcing rules.

Multidimensional rules allow the rules engine to effectively process a set of rules that have a non-linear relationship and that either conflict or provide synergy with other rules.

An example of conflicting rules is one rule that enforces the cheapest resource utilization and another rule that enforces highest performance. Since each rule, run individually, would produce a different result, when used in combination the result is unpredictable. If cost was prioritized, then on the next evaluation, performance criteria would fail and an action might be triggered to re-schedule the resource.

In order to solve this issue, multidimensional rules allow the detection of dependent rules and any conflicts or synergies in multiple measurable dimensions (i.e., cost and performance).

Where a conflict or synergy is found, the rules engine starts performing trials. A trial is an operation when the rules engine subjectively decides which rule takes precedence over another rule or rules and instructs the scheduler to deploy a resource in favor of the first rule. So, with reference to FIG. 9, once a data volume resource creation is requested 501, a scheduler asks the rules engine 502 for policies defined for this particular volume. In this case, the rules engine detects multiple rules 503 and based on priority (or randomly if no priority is set) decides according to which rule the volume should be deployed, at 504 (e.g., placed on a particular computing resource).

Once a resource has been deployed (e.g., placed on a particular computing resource) the rules engine starts collecting performance metrics, at 505. For example, performance metrics may relate to: the speed of memory access (e.g., latency), the number of input/output (I/O) operations per unit of time, the size of I/O operations, replication latency, the size of a queue, CPU utilization, or any combination thereof. The rules engine then calculates a score 506 for this rule deployment based on at least one of the performance metrics. For example, the rules engine may compute an average score for a particular performance metric or average scores for multiple performance metrics. The score may be some value that corresponds to one or more of the performance metrics that are collected.

If this score (or scores) is deemed unacceptable, at 507, the rules engine is notified of the score via feedback, at 508. The score may be evaluated against many criteria to determine whether the score is acceptable. For example, the score may be deemed acceptable if the score meets the average score of other resources in the cluster, or if it meets a user-defined requirement. The criteria for judging the acceptability of a score can be pre-loaded into the rules engine. Additionally, the criteria for judging the acceptability of a score may be application-specific, customer-specific, and/or dependent on some other factor or factors.

If the score is not deemed to be acceptable, the rules engine can adjust rule attributes and try a different configuration for the requested volume, at 502, instructing the scheduler to change the deployment if necessary.

In an embodiment, rules are constantly re-evaluated and the process repeats (e.g. in an iterative manner) until an acceptable score or until the best score has been achieved. In an embodiment, the best score may be the highest score that is found during some number of iterations.

Some rules might enforce resource redeployment only during hours when the resource is not used (or during hours of lower or minimum activity (e.g., relatively low I/O operations), e.g., at a time when the corresponding enterprise is closed for business). Implementing resource redeployment during hours when the resource is not used (or during hours of lower or minimum activity, e.g., at a time when the corresponding enterprise is closed for business), allows for non disruptive automated cluster tuning.

Once the score is deemed acceptable or the best score has been achieved with all other constraints met, the rules engine marks deployment or placement as successful, at 509.

Object Descriptors

Object descriptors are strings of information that describe resources that are processed by the rules engine and the scheduler. The object descriptors can be attached to a resource by an operator, or can be automatically inferred by the rules engine upon evaluation of the rulebase. The object descriptor may also be attached by an environment scanning submodule 404 (FIG. 5).

The rules engine may evaluate one or more object descriptors to derive attributes or environmental constraints.

Various techniques for storing a volume of data are disclosed.

In various embodiments, a rules processing method and system that includes a lexical processing unit such that business objectives can be interpreted into a rule-based format suitable for application by a computer system are disclosed.

In an embodiment, a variety of natural language input methods may be used.

In an embodiment, a rules engine may be used.

In an embodiment, a rules engine that can adapt one or more running computer systems may be used.

In an embodiment, a scheduler can process events and operator requests using the parsing capability of the rules engine to determine attributes and environmental constraints of a computer system or a number of computer systems.

In an embodiment, a scheduler implements technical operators and affects changes to the configuration of a computer system or a number of computer systems based on events and operator requests.

In an embodiment, a method to process business intent through the definition of business operators which are linked to technical operators is disclosed. Technical operators can be implemented within a computer system to implement the business intent described in the business operators.

In an embodiment, a database that describes technical operators relating to a storage system such that attributes of volumes and technical implementations of a storage system can be codified and linked to business operators may be used.

In an embodiment, a scheduler that can implement technical operators and affect changes to the configuration or running operation of a computer system of a number of computer systems where such computer systems provide resources to a storage system may be used.

In an embodiment, a scheduler that can implement technical operators and affect changes to the configuration or running operation of a computer system of a number of computer systems where such computer systems utilize resources from a storage system may be used.

In an embodiment, a scheduler that can implement technical operators and affect changes to the configuration or running operation of a computer system of a number of computer systems where such computer systems are components and resource of a storage system may be used.

In an embodiment, additional domain specific language databases can be added to the system to allow the rules engine and scheduler to manage other technologies as they are added to an existing environment.

In an embodiment, operator supplied computer code is integrated into the rules parsing engine to allow the rules engine to determine attributes from the computer system environment that are propriety or not commonly known to the rules engine In an embodiment, operator supplied computer code is integrated into the scheduler to allow the scheduler to apply changes to a computer system or a number of computer systems where those systems are propriety or not commonly known to the scheduler.

In an embodiment, operator supplied computer code is integrated into the scheduler to allow the scheduler to implement technical operators and affect changes to the configuration or running operation of a computer system of a number of computer systems where such computer systems utilize resources from a storage system.

In an embodiment, a multi-dimensional rules engine can work with non linear relationship based requirements and tune a working system through experimentation and performance measurement.

As used herein, a computer application or application program may be a software program that runs on a computer and is the most common software on computers. Web browsers, e-mail programs, word processors, and databases are all example of computer applications.

As used herein, a file may be a collection of digital data stored in one unit, identified by a filename. The file can be a document, picture, audio or video stream, a data library, application, or another collection of data.

As used herein, a database may be a data structure that stores information and data that is organized to allow easy retrieval of the information. Typical databases contain multiple structures called tables, which may each include several different fields of data. For example, a company database may include tables for products, employees, and financial records. Each of the tables may have different fields that are relevant to the information stored in the table.

As used herein, a storage system may be a collection of computers, software applications, and storage devices that together operate to provide the persistence and retrieval of data from storage devices to and from computer applications and databases.

As used herein, a data block, a block of data, or simply a "block," is a sequence of bytes or bits, typically containing some whole number of records, that has a maximum length, e.g., a block size. The process of putting data into blocks is called blocking, while deblocking is the process of extracting data from blocks. Blocked data is normally stored in a data buffer and read or written a whole block at a time. Blocking can reduce the overhead in storage systems and can speed up the handling of a data-stream. Blocking is usually implemented when storing data to 9-track magnetic tape, to NAND flash memory, and to rotating media such as hard disks and optical disks. Most file systems are based on a block device, which provides a level of abstraction for the hardware responsible for storing and retrieving specified blocks of data, though the block size in file systems may be a multiple of the physical block size. Block storage is typically abstracted by the file system or database management system (DBMS) for use by computer applications and end users.

As used herein, a volume of data is a single accessible storage area with a single file system, typically, though not necessarily, residing on a single partition of a hard disk. In an embodiment, a volume of data can be different from a physical disk drive, however, the volume of data can be accessed with an operating system's logical interface. A volume of data is a logical representation of a number of data blocks, which data blocks are concatenated to form a larger set of data than can be stored as a group of data blocks. A volume of data is not the same as a partition in computer storage. For example, a floppy disk might be accessible as a volume, even though the floppy disk does not contain a partition, as floppy disks cannot be partitioned with most modern computer software. Furthermore, an operating system can recognize a partition without recognizing any volume associated with the partition, as when an operating system cannot interpret the filesystem stored there. Volumes of data exist at the logical operating system level while partitions exist at the physical, media specific level. Sometimes there is a one-to-one correspondence, but this is not a requirement. In Unix-like operating systems, volumes other than the boot volume have a mount-point somewhere within the filesystem, represented by a path. Logically, the directory tree stored on the volume is grafted in at the mountpoint. By convention, mount-points will often be placed in a directory called '/mnt', though '/media' and other terms are sometimes used. Files within a volume of data can generally be moved to any other place within that volume by manipulating the filesystem, without moving the actual data. However, if a file is to be moved outside the volume, the data itself must be relocated, which is a much more expensive operation.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system.

The computer-useable or computer-readable medium can be an electronic, magnetic, optical, electromagnetic, infrared, or semiconductor system (or apparatus or device). Examples of a non-transitory computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Figure 10:
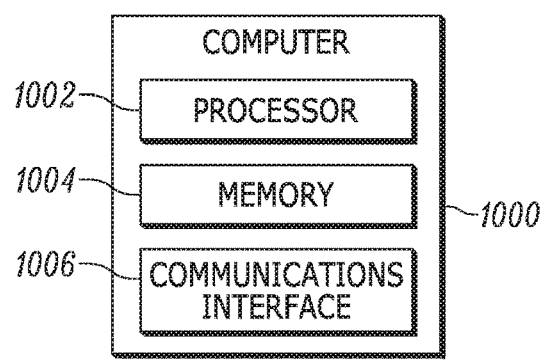
FIG. 10 depicts a computer that includes a processor, memory, and a communications interface.

In an embodiment, the above-described functionality is performed at least in part by a computer or computers, which executes computer readable instructions. FIG. 10 depicts a computer 1000 that includes a processor 1002, memory 1004, and a communications interface 1006. The processor may include a multifunction processor and/or an application-specific processor. Examples of processors include the PowerPC™ family of processors by IBM™ and the x86 family of processors by Intel™ such as the Xeon™ family of processors and the Intel™ X5650 processor. The memory within the computer may include, for example, a non-transitory storage medium such as read only memory (ROM), flash memory, RAM, or a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for provisioning a volume of data, the method comprising:
    a rules engine identifying a set of placement rules associated with the volume of data, wherein the set of placement rules includes at least two conflicting placement rules;
    the rules engine prioritizing the at least two conflicting placement rules;
    a scheduler placing the volume of data on a first computer system according to the prioritization of the at least two conflicting placement rules;
    after the volume of data is placed on the first computer system, the rules engine collecting performance metrics corresponding to the volume of data placed on the first computer system, wherein the performance metrics relate to at least one of the speed of memory access, the number of input/output (I/O) operations per unit of time, the size of I/O operations, replication latency, the size of a queue, and central processing unit (CPU) utilization;
    after the volume of data is placed on the first computer system, the rules engine computing a score for the volume of data placed on the first computer system based on the collected performance metrics;
    after the volume of data is placed on the first computer system, the rules engine determining if the computed score for the volume of data placed on the first computer system is acceptable; and
    after the volume of data is placed on the first computer system, the rules engine changing the prioritization of the at least two conflicting placement rules relative to each other, the scheduler changing the placement of the volume of data according to the changed prioritization of the at least two conflicting placement rules, and the rules engine recomputing the score based on the changed placement, the prioritization changing, the placement changing, and the score recomputing repeating iteratively until the computed score for the volume of data is determined to be acceptable, wherein changing the prioritization of the at least two conflicting rules involves changing which of the at least two conflicting rules takes precedence over the other of the at least two conflicting rules in the placement of the volume of data.

2. The method of claim 1 wherein the volume of data is placed on a second computer system only during hours when the second computer system is not used.

3. The method of claim 1 wherein the volume of data is placed on a second computer system during a period of time in which activity on the second computer system is relatively low compared to activity on the second computer system during a time when a corresponding enterprise is open for business.

4. The method of claim 1, further comprising:
    after the volume of data is placed on a second computer system, collecting performance metrics corresponding to the volume of data placed on the second computer system;
    after the volume of data is placed on the second computer system, computing a score for the volume of data placed on the second computer system based on the collected performance metrics;
    after the volume of data is placed on the second computer system, determining if the computed score for the volume of data placed on the second computer system is acceptable; and
    after the volume of data is placed on the second computer system, changing the prioritization of the at least two conflicting rules and changing the placement of the volume of data to a third computer system according to the changed prioritization when the computed score for the volume of data placed on the second computer system is determined to be unacceptable.

5. A non-transitory computer readable medium that stores computer executable code, which when executed by one or more processors, implements a method for provisioning a volume of data, the method comprising:
    a rules engine identifying a set of placement rules associated with the volume of data, wherein the set of placement rules includes at least two conflicting placement rules;
    the rules engine prioritizing the at least two conflicting placement rules;
    a scheduler placing the volume of data on a first computer system according to the prioritization of the at least two conflicting placement rules;
    after the volume of data is placed on the first computer system, the rules engine collecting performance metrics corresponding to the volume of data placed on the first computer system, wherein the performance metrics relate to at least one of the speed of memory access, the number of input/output (I/O) operations per unit of time, the size of I/O operations, replication latency, the size of a queue, and central processing unit (CPU) utilization;
    after the volume of data is placed on the first computer system, the rules engine computing a score for the volume of data placed on the first computer system based on the collected performance metrics;
    after the volume of data is placed on the first computer system, the rules engine determining if the computed score for the volume of data placed on the first computer system is acceptable; and
    after the volume of data is placed on the first computer system, the rules engine changing the prioritization of the at least two conflicting placement rules relative to each other, the scheduler changing the placement of the volume of data according to the changed prioritization of the at least two conflicting placement rules, and the rules engine recomputing the score based on the changed placement, the prioritization changing, the placement changing, and the score recomputing repeating iteratively until the computed score for the volume of data is determined to be acceptable, wherein changing the prioritization of the at least two conflicting rules involves changing which of the at least two conflicting rules takes precedence over the other of the at least two conflicting rules in the placement of the volume of data.

6. The non-transitory computer readable medium of claim 5, wherein the volume of data is placed on a second computer system only during hours when the second computer system is not used.

7. The non-transitory computer readable medium of claim 5, wherein the volume of data is placed on a second computer system during a period of time in which activity on the second computer system is relatively low compared to activity on the second computer system during a time when a corresponding enterprise is open for business.

8. The non-transitory computer readable medium of claim 5, further comprising:
- after the volume of data is placed on a second computer system, collecting performance metrics corresponding to the volume of data placed on the second computer system;
- after the volume of data is placed on the second computer system, computing a score for the volume of data placed on the second computer system based on the collected performance metrics;
- after the volume of data is placed on the second computer system, determining if the computed score for the volume of data placed on the second computer system is acceptable; and
- after the volume of data is placed on the second computer system, changing the prioritization of the at least two conflicting rules and changing the placement of the volume of data to a third computer system according to the changed prioritization when the computed score for the volume of data placed on the second computer system is determined to be unacceptable.

* * * * *